United States Patent
Estes, Jr.

(10) Patent No.: US 9,588,871 B1
(45) Date of Patent: Mar. 7, 2017

(54) METHOD AND SYSTEM FOR DYNAMIC BUSINESS RULE EXTRACTION

(71) Applicant: Donald Leland Estes, Jr., Bedford, MA (US)

(72) Inventor: Donald Leland Estes, Jr., Bedford, MA (US)

(73) Assignee: Don Estes & Associates, Inc., Bedford, MA (US)

( * ) Notice: Subject to any disclaimer, the term of this patent is extended or adjusted under 35 U.S.C. 154(b) by 0 days.

(21) Appl. No.: 15/019,957

(22) Filed: Feb. 9, 2016

Related U.S. Application Data

(60) Provisional application No. 62/147,533, filed on Apr. 14, 2015.

(51) Int. Cl.
  *G06F 9/44* (2006.01)
  *G06F 11/36* (2006.01)
(52) U.S. Cl.
  CPC .................. *G06F 11/3624* (2013.01)
(58) Field of Classification Search
  CPC ... G06F 11/30; G06F 11/3003; G06F 11/3624
  See application file for complete search history.

(56) References Cited

U.S. PATENT DOCUMENTS

| | | | |
|---|---|---|---|
| 5,475,624 A * | 12/1995 | West .............. | G01R 31/318342 703/13 |
| 5,649,180 A | 7/1997 | Danno et al. | |
| 5,970,244 A | 10/1999 | Nagahashi et al. | |
| 5,983,335 A * | 11/1999 | Dwyer, III .......... | G06F 9/30072 712/215 |
| 6,061,513 A | 5/2000 | Scandura | |
| 6,076,173 A * | 6/2000 | Kim .................. | G01R 31/31835 714/25 |
| 6,389,588 B1 | 5/2002 | Wadhwa et al. | |

(Continued)

FOREIGN PATENT DOCUMENTS

| | | |
|---|---|---|
| CA | 2284949 A1 | 4/2001 |
| CA | 2641941 A1 | 11/2007 |

(Continued)

*Primary Examiner* — Chameli Das
(74) *Attorney, Agent, or Firm* — Intellent Patents LLC; Ahmed Alhafidh

(57) ABSTRACT

The invention relates to a method and system for discovering and documenting the business knowledge contained in the functions of each program of existing software applications as expressed in the source code of each program using a novel method of dynamic business rule extraction that overcomes the inherent limitations of previous methods. The novelty of the method results from the deterministic relationship between program functions and the program code executed to perform each function as revealed by empirical analysis of the actual code execution, hence "dynamic" business rule extraction. This compares to previous methods which utilized a manual process, a fully automated process, and/or a process of analysis against the non-executing source code of each programs in which the analyst must infer the execution path, hence "static" business rule extraction. Furthermore, dynamic business rule extraction can deliver results without errors or omissions and document forensically that it has done so.

18 Claims, 6 Drawing Sheets

(56) References Cited

U.S. PATENT DOCUMENTS

| | | |
|---|---|---|
| 6,745,382 B1 | 6/2004 | Zothner |
| 6,978,228 B1 | 12/2005 | Gordon |
| 7,316,008 B1 | 1/2008 | Dutta |
| 7,861,226 B1* | 12/2010 | Episkopos .......... G06F 11/3676 717/124 |
| 7,917,457 B2 | 3/2011 | Marfatia et al. |
| 8,412,653 B2 | 4/2013 | Marfatia et al. |
| 8,533,687 B1* | 9/2013 | Greifeneder ........ G06F 11/3495 717/127 |
| 2002/0095660 A1* | 7/2002 | O'Brien .............. G06F 11/3466 717/127 |
| 2002/0099579 A1* | 7/2002 | Stowell ................ G06Q 10/06 705/7.39 |
| 2002/0099598 A1* | 7/2002 | Eicher, Jr. ............. G06Q 10/06 705/28 |
| 2003/0083900 A1 | 5/2003 | Khriss et al. |
| 2005/0234976 A1 | 10/2005 | Oara et al. |
| 2009/0177642 A1* | 7/2009 | Chung ................ G06F 11/3419 |
| 2010/0153923 A1* | 6/2010 | Kawahito ................ G06F 8/40 717/124 |
| 2010/0293519 A1* | 11/2010 | Groves ............... G06F 11/3616 717/101 |
| 2011/0295854 A1* | 12/2011 | Chiticariu ......... G06F 17/30616 707/737 |
| 2011/0314450 A1* | 12/2011 | Shochat ................ G06Q 10/06 717/124 |
| 2012/0204154 A1* | 8/2012 | Li ....................... G06F 11/3684 717/124 |
| 2014/0282396 A1 | 9/2014 | Manjarekar |
| 2015/0110362 A1* | 4/2015 | Amtrup ............. G06K 9/00469 382/112 |
| 2015/0134585 A1 | 5/2015 | Chen et al. |
| 2015/0268955 A1 | 9/2015 | Mehalingam et al. |

FOREIGN PATENT DOCUMENTS

| | | |
|---|---|---|
| JP | 4820924 B1 | 11/2011 |
| JP | 2012164148 A | 8/2012 |
| WO | 0179996 A1 | 10/2001 |

* cited by examiner

WHEN WE TEST SOFTWARE

| WHAT WE KNOW TO BE CORRECT | WHAT WE'RE TRYING TO DISCOVER |
|---|---|
| • Functional requirements<br>• Business Rules | • Does program behavior conform to<br>  • Functional requirements<br>  • Business rules |

WHEN WE USE DYNAMIC BUSINESS RULE EXTRACTION

WHAT WE'RE TRYING TO DISCOVER

- Do proposed functional requirements and business rules conform to
  - Program behavior

WHAT WE KNOW TO BE CORRECT

- Program behavior

| Reason True | Reason False | Filter | Coverage | Rule | Source |
|---|---|---|---|---|---|
| | | | B1 | 00686 | WHEN GOOD RESULT |
| | | | E | 00687 | PERFORM 8100-CALL-PROCESSING-RTN |
| | | | E | 00688 | THRU 8100-EXIT |
| | | | B0 | 00689 | WHEN IO-ERROR-REPORTED |

▨ RED HIGHLIGHTING

▩ YELLOW HIGHLIGHTING WITH RED TEXT

FIGURE 4

| Reason True | Reason False | Filter | Coverage | Rule | | Source |
|---|---|---|---|---|---|---|
| | | | B3 | 123 | 00686 | WHEN GOOD-RESULT |
| | | | E | | 00687 | PERFORM 8100-CALL-PROCESING-RTN |
| | | | E | | 00688 | THRU 8100-EXIT |
| | | F2 | B1 | | 00689 | WHEN IO-ERROR-REPORTED |

▨ RED HIGHLIGHTING
▩ YELLOW HIGHLIGHTING WITH RED TEXT

FIGURE 5

| Reason True | Reason False | Filter | Coverage | Rule | Source | |
|---|---|---|---|---|---|---|
| | | | B3 | 123 | 00686 | WHEN GOOD-RESULT |
| | | | E | | 00687 | PERFORM 8100-CALL-PROCESSING-RTN |
| | | | E | | 00688 | THRU 8100-EXIT |
| | Abend I/O Error | F2 | B1 | | 00689 | WHEN I-O-ERROR-REPORTED |

▨ LIGHT GREY HIGHLIGHTING WITH DARK BLUE TEXT

FIGURE 6

METHOD AND SYSTEM FOR DYNAMIC BUSINESS RULE EXTRACTION

1 FIELD OF TECHNOLOGY

This disclosure relates generally to data processing devices and, more particularly, to a method, a device and/or a system of dynamic business rule extraction.

2 BACKGROUND

2.1 Field of the Invention

The invention relates to a method and a system for discovering and documenting the business knowledge used to originally create and subsequently amend existing software applications (a process commonly referred to as "business rule extraction" or by the acronym "BRE") for the purpose of documentation or for the purpose of creating or deploying software applications which partially or wholly replace parts or all of the existing software application with functionality that broadly serves the same or a modified business purpose. The invention uses a novel method that overcomes the inherent limitations of previous attempts to do the same using different methods. The invention may be used to complement or replace existing methods or products.

2.2 Description of the Related Art
2.2.1 General Business Rule Extraction When programmers create a completely new software system using traditional languages such as COBOL, C, or Java, they do so from a set of functional and non-functional requirements that specify precisely what each function must do and what each non-functional characteristic must be. Functional requirements are further specified by association with business rules that specify precisely how each such function shall perform its task. The job of the programmer is to take these requirements with associated business rules and create program source code that, when rendered into executable form, will operate in accordance with the requirements and associated business rules.

Business rule extraction reverses this programming process. Business rule extraction is the process of analyzing programming artifacts when the functional requirements (with associated business rules) and the non-functional requirements may not be known, or perhaps only known imperfectly due to errors and/or omissions. Those artifacts include (but are not limited to) program source code, database specifications, online screen layouts, user documentation, operational instructions, and the like.

Testing software is the process of observing whether an executing program's behavior conforms to those functional requirements and associated business rules. By definition, these requirements are known. Thus test cases can and will be employed to observe whether the execution of the program produces the expected results, since the expected results are known from the requirements and associated business rules (see FIG. 1).

Dynamic business rule extraction reverses the process of testing. In a novel use of a standard process, the program's behavior is used to discover and remediate errors and omissions in the knowledge of the functional requirements and associated business rules that underlay the processing of the existing program (see FIG. 2). In so doing, the problem of errors and omissions in extracted business rules from all other BRE processes is solved. Test cases will reveal errors in the extracted business rules. Coverage analysis will reveal omissions in the extracted business rules.

Both the purpose and the remediation efforts for testing and for dynamic BRE are inverted. The remediation of observed defects in behavior during the testing process will require revision to the program until its behavior correctly corresponds to the functional requirements and associated business rules. Conversely, observed errors and omissions in the understanding of the functional requirements and associated business rules will require revision to that understanding until they both fully correspond to the behavior of the program.

Business rule extraction is most frequently a purely manual process, in which the process of business analysis will include interviews with subject matter experts and other knowledgeable individuals, and a manual review of the artifacts associated with the application, including but not limited to application source codes, other machine readable information, documentation in printed and electronic form, and other non-machine readable information. This process suffers significantly from errors and omissions in the results, increasing disproportionately with the scale of the computer application software system.

Some vendors offer a fully automated business rule extraction service by analysis of the program source code which results in a form of algorithmic business rules. Because of inherent limitations on what can be inferred using program source code analysis techniques, the results suffer because logically related program code may lose those relationships. The consequence is that the results are difficult to use and contain errors and omissions which are not obvious.

There are a number of products generally available which meet the definition of static business rule extraction discussed below in section 2.2.3. These products are semi-automated and produce results which are better than manual business rule extraction and better than the automated business rule extraction, yet still suffer from errors and omissions.

The job of the business rule analyst is to take the relevant set of existing application program artifacts and work backwards from the completed program to derive the algorithmic steps associated with each function and from them infer the original statement of the business rules, including any subsequent amendments or other updates. The purpose of deriving the original business rules is for generating documentation, for use in creating a partially or wholly replacement system, or both.

It is not unusual for business analysts and others who created those original requirements to casually blur the distinction between "requirements" and "business rules." Herein we strictly define "functional requirements" as what each function must do and the associated "business rules" as how that function shall operate. (All definitions are drawn from those documented in section 5.2, and if there is any conflict between a definition given in context and the equivalent definition in section 5.2 then the latter shall prevail.) We are concerned only with the functional requirements because only functional requirements have associated business rules. We will not further consider non-functional requirements herein.

Many of the problems associated with creating a replacement system result from ambiguities in the human language expression of these business rules, and/or errors and/or omissions in the detail of these business rules, all of which must be discovered during the course of development and testing of any planned replacement software application in order to create the desired result. Testing, which is typically based on the requirements, is by definition blind to errors and omissions in the business rules associated with those requirements. Hence, the common experience of replacing large scale existing software applications is for them to exhibit serious and potentially destructive functional defects when placed into production, even after passing what was thought to be a thorough and comprehensive set of tests. These defects lead to extended periods of time to correct as well as significant cost overruns. Latent defects, which may not occur immediately or may not be recognized immediately, will remain in the operating software application to create future problems and incur future costs.

As a consequence, the only complete, correct and unambiguous expression of the functions and business rules from a non-trivial existing software application consists of the source codes of the programs that are used to create the executable form of the programs, and which comprise that existing system.

For the same reason, any documentation associated with a non-trivial, existing software application will inevitably contain errors, omissions and ambiguities, quite possibly very significant ones. If such documentation is used for the purpose of creating new software to partially or wholly replace the existing systems, then that will lead to extended periods of time to correct in any replacement system as well as significant cost overruns in the project to create and deploy that replacement system.

Business rules associated with functional requirements are usually stated as an abstraction. The following is an example of an abstract business rule:

a) "Do not allow the balance in the account to go below zero when processing a debit transaction."

In the course of programming, each abstract business rule will be reduced to a series of algorithmic steps. The following is a simple example of an algorithmic business rule which is equivalent to the example abstract business rule above:

a) Validate the incoming debit transaction by testing that all data elements with a numeric type contain numeric values, and that there are no low level technical errors in the format of the transaction
b) Read the account record equivalent to the account number in the transaction and lock the record to prevent other concurrent updates
c) If there is a low level technical error reading the account record, reject the transaction and exit the algorithm
d) If the account record does not exist, reject the transaction and exit the algorithm
e) If the account record does not show a status of "open", reject the transaction, abort the update of the account record, unlock the record and exit the algorithm
f) Reduce the account balance in the account record by the amount of the debit
g) If the resulting account balance is less than zero, reject the transaction, abort the update of the account record, unlock the record and exit the algorithm
h) Process the debit transaction, update the database, unlock the record, and exit the algorithm There are many definitions of a "business rule" but for business rule extraction the best definition was derived by the Business Rules Group (formerly, known as the GUIDE Business Rules Project)[1], which defines " . . . a business rule expresses specific constraints on the creation, updating, and removal of persistent data in an information system." In other words, a business rule is associated with allowing or rejecting a change of state within the persistent data store.

Business analysts and business personnel in general think of "business rules" as the abstractions, whereas programmers think of "business rules" as the algorithmic steps. Both definitions are consistent with the Business Rules Group definition. Herein, when a distinction is necessary for clarity, we shall refer to "abstract business rules" or "algorithmic business rules." When a distinction is not necessary, we shall refer to "business rules" as meaning either one or both. The principal reason for making the distinction is that it is significantly more expensive to derive abstract business rules from the algorithmic business rules than to derive algorithmic rules and stop. Some projects will require extracting the abstract business rules while others may require only extracting the algorithmic business rules.

In general, use of the algorithmic business rules is usually sufficient when implementing a business rule management system within an existing application, or when rewriting parts or all of an existing system to preserve the existing functionality. Unless desired for documentary reasons, the extra expense of creating abstract rules is unlikely to be cost justified in these circumstances. Conversely, use of the abstract business rules is usually necessary when replacing an existing system with a commercial off the shelf package or when redesigning the existing system in some fundamental way to be followed by a new implementation of a replacement system. These are guidelines, not prescriptions or requirements.

The invention described herein is concerned with extracting algorithmic business rules without errors or omissions, which may or may not be subsequently abstracted into abstract business rules, and validating the algorithmic business rules and/or the abstract business rules as is relevant in a given instance.

Functional requirements may be associated with an event that could create a change of state in the persistent data, defined as an update transaction, or it may be associated with inquiring on data in the persistent data store, defined as a query transaction, which will not create a meaningful change of state. Therefore, where a distinction is relevant, we define the business rules associated with update transactions as "transactional business rules".

The transactional business rules directly associated with functional requirements also depend on the concepts, entities and relationships that define both the transient and persistent data. We define these concepts, entities, attributes and relationships as "conceptual business rules" which may be used by both query transactions and update transactions. When a distinction is not relevant, we use "business rules" to include both the transactional business rules and the conceptual business rules which give meaning to the transactional business rules.

Loosely speaking, the conceptual business rules describe the data with their relationships, and the transactional business rules describe the details of the executable program instructions. This is an oversimplification but may help clarify the distinction.

There are also some programs that update the persistent data store under circumstances other than the occurrence of an event, such as a rules driven process that evaluates the contents of the database based on a difference in time or other attribute of the persistent data store. These are batch programs since they are not associated with any event such as the arrival of a message transaction. These rule driven processes are defined as "periodic batch programs". Although these processes are not actuated by the arrival of a message transaction, because they are associated with a change of state in the database each such update of the persistent data also constitutes an update transaction, and the business rules that govern the selection of data and the decision to update that data also constitute transactional business rules.

To summarize, the relationships between requirements and business rules can be expressed as follows:
a) Set of all requirements
   i) Subset of non-functional requirements
      (1) (No associated business rules)
   ii) Subset of functional requirements
      (1) Subset of query functions
         (a) Associated conceptual business rules
      (2) Subset of update functions (including periodic batch programs)
         (a) Associated conceptual business rules
         (b) Associated transactional business rules The Business Rules Group business rule definition refers to transactional business rules which implicitly incorporate conceptual business rules, and this is the rigorous definition that we use, i.e., both transactional business rules and conceptual business rules. However, query transactions, which by definition do not create, update or remove persistent data, do utilize conceptual business rules. This finer distinction extends rather than contradicts the Business Rules Group definition.

Because of this definition, BRE always applies to update programs, even those which have a query capability as a component of their functions, but only rarely to query only programs. Analyzing the query logic in a query program or in a query component of an update program can expose a previously missed conceptual business rule, but in practice this is rarely done. Doing so is a matter of professional judgment by the project team. Many projects will analyze no query programs at all.

Returning to our example, conceptual business rules would define the "account" entity with its associated attributes such as the balance, as well as other entities which relate to the account such as the transient transaction data, the persistent history of previous transactions and the relationship among all such entities. Conceptual business rules also define reference data such as parameters that control the processing of debit transactions for this type of account and define transient data such as that used to perform the arithmetic to apply the amount of the debit transaction to the existing balance in the account.

When performing business rule extraction, the business rule analyst must first determine enough of the conceptual business rules to define the meaning of the functions to be subsequently analyzed and to create a vocabulary that can be used to analyze and describe the functions and associated transactional business rules. This is typically begun by analyzing the existing data model prior to beginning any business rule extraction.

During business rule extraction, these conceptual business rules may be extended and perhaps amended based on new discoveries during the analysis of the program(s) by whatever method. As transactional business rules are discovered within the program(s) and added to the set of identified transactional business rules, the concepts that they reference may be found to not exist within the set of identified conceptual business rules or the concepts may indicate errors or omissions within the set of conceptual business rules. If so, then the set of conceptual business rules will be extended or amended accordingly.

Transactional business rules depend on conceptual business rules to give them meaning. The conceptual business rules are universal across all functions in that they can be used anywhere within the scope of the application system.

When using the invention to extract transactional business rules, errors and omissions in the understanding of the conceptual business rules become clear, so the invention applies to both conceptual and transactional business rules.

Transactional business rules are directly associated with specific functions and thus are implicitly local rather than universal. The set of transactional business rules associated with each function may be completely disjoint, partially overlap, or completely overlap the respective sets of transactional business rules associated with each of the other functions of the software application. In summary, conceptual business rules are always universal to the software application while transactional business rules could in theory be universal but typically are not.

When performing business rule extraction, the business rule analyst must determine, for each discovered function, that there is one or more associated business rules, then find and document the algorithmic steps that are the programmatic expression of each business rule. If abstract business rules are required, then the business rule analyst must also interpret those steps to recreate the original abstract expression of the business rules, but this abstraction is a distinct and separate process from deriving the conceptual business rules and the programmatic steps of the algorithmic business rules.

In the process of performing the analysis, the analyst may also discover and document previously undiscovered functions, but doing so is incidental to business rule extraction and does not enter into this description except insofar as previously unknown business rules are associated with a newly discovered function. The entire process of business rule extraction is iterative in the sense that the business rule analyst begins with what is known or thought to be known about the business rules of the system, and then refines and extends the analysis until complete.

In the process of documentation, the algorithmic and/or abstract business rules may be expressed in a human language such as English, in a pseudo-code, in a formal computer language, in a business rules language, in a business rules decision table, or in any other form which may or not may be directly executable and which may or may not preclude ambiguities in their expression.

2.2.2 Coverage Analysis

The execution of a program under conditions that allow the recording of the logic paths that are actually executed within the program is typically called code coverage analysis, test coverage analysis, test code coverage analysis, or simply coverage analysis. Coverage analysis is a technique of long standing for aiding the process of testing software programs against both functional and non-functional requirements. By the nature of software testing, the requirements are known and it is the behavior or nature of the program which is being analyzed for conformance with those requirements. All discussions of coverage analysis researched to date have related to this purpose of testing against known requirements, both functional and non-functional.

Each logical decision point in a program creates two logical pathways for subsequent execution, one in which the decision results in a true condition, and the other in which the decision results in a false condition. Coverage analysis, summed over the execution of one or more test cases, records the cumulative execution results for each decision point in a program, whether:
a) the true logic path was executed,
b) the false logic path was executed,
c) both logic paths were executed, or
d) neither logic path was executed.

The coverage analysis report may or may not report false logic path coverage if the false logic path is implicit rather than explicit.

The coverage report may or may not separately report true and false results from each component conditional statement of a compound conditional statement.

The scope of coverage reports is determined by the number of test cases used for a test execution of the program and the content of each test case. If only a single test case is used after resetting the counters used to record the execution of instructions, then only the logic associated with that one transaction will show as executed in the report. If more than one test case is executed at a time, or multiple executions without clearing the counters, then a cumulative coverage analysis report results showing the code executed by any of the test cases. If all test cases are executed then the resulting cumulative report that is produced may indicate omissions in the test cases and thereby determine additional test cases that may need to be created to meet coverage goals.

Testing against expected results is a "black box" test—do the inputs result in the expected outputs? Testers are typically not programmers, do not typically debug a program which fails conform to requirements, and typically have no knowledge of the internals of a program. Although black box testers do not typically examine the internals of the program, they may create cumulative coverage analysis reports to determine whether or not their tests have reached some specific overall coverage percentage, typically 80% or 90%. In this regard, their interest may be only in the statistics from the report, not the executable statement content.

Coverage analysis is a "white box" process, in which the internal instructions of a program are revealed to those who will utilize the resulting reports, both those statements executed and those statements not executed. When utilized for dynamic BRE, it is this white box mode in which coverage analysis is used, particularly for the single transaction coverage analysis reports.

2.2.3 Static Business Rule Extraction

All existing products and automated techniques for discovering business rules in existing programs analyze the source codes of those programs and only the source codes, i.e., the human readable program code that is translated into executable object form prior to production execution. In other words, the analysis of a program source code by existing technologies is static, meaning that there is no change in the state of the program during the analysis, hence the term "static business rule extraction" (or "static BRE" for short) to distinguish it from the invention described herein for which we use the term "dynamic business rule extraction" (or "dynamic BRE" for short).

Earlier attempts to automate business rule extraction are either fully automated or are semi-automated in which a static business rules analyst will research the source code of the existing application using an interactive analytical utility which uses parsing tools originally derived from compiler design and implementation. (See, for example, U.S. Pat. No. 6,389,588, "Method and system of business rule extraction from existing applications for integration into new applications".)

The logic paths that are executed when the program is in use must be inferred by the static business rules analyst, since it is not actually executing. The greater the level of complexity of the program, the greater the number of ambiguities and missed interrelationships that arise in this inferencing process. The level of complexity increases disproportionately with the size of the program. Therefore, this inferencing process will be weakest in the largest, most complex, and usually most important programs within the application system.

Inferential analysis cannot by its nature eliminate all ambiguities in non-trivially complex programs. Consequently, there is no clear test or rigorous definition which a static BRE analyst can use to determine when or if they have reached 100% of the business rules to be extracted. In practice, static BRE will usually stop before identifying all of the subtle interactions among a significantly sized program's many strands of logic and the reference and transactional data that drives the logic.

This inferential approach, while a distinct improvement over the purely manual methods that preceded it, fails to capture all of the business rules in programs of non-trivial complexity and has no method for unambiguous validation of the extracted rules, resulting in both errors and omissions in the resulting business rules. The limitations of static BRE are discussed in more detail in section 2.3, as well as a description of how dynamic BRE overcomes these limitations.

Similarly, when the BRE analyst records the business rules extracted in a human language such as English, there is an opportunity for additional ambiguities to be introduced. When a programmer utilizes these expressed rules there is the opportunity for further errors of interpretation to occur. There is no clear test or rigorous definition by which a consumer of the extracted business rules can determine whether or not the resulting extraction contains errors and/or omissions, except through the method and system used by the invention.

2.3 Technical Comparison of Static and Dynamic BRE

As discussed above, testing observes whether or not the behavior of a program under test conforms to the expected behavior of known functional requirements with known associated business rules. In business rule extraction, it is the unknown or imperfectly known business rules associated with the program's functions that we seek to discover.

For dynamic BRE, the state of the program is constantly changing during the course of the analysis. In dynamic BRE we pursue our discovery by observing the behavior of a program's internal execution to expose a set of previously unknown or imperfectly known business rules, and then to validate that we have done so.

Both testing and dynamic BRE execute the program against test cases, but with different purposes and different outcomes. With testing we know the functions and business rules but the behavior is uncertain. Conversely, with dynamic BRE we stipulate that the behavior of each program is correct and seek to discover the unknown or imperfectly known business rules that are associated with the program's functions.

The problems of static BRE that dynamic BRE seeks to overcome are the ultimately ambiguous results from the inferential analysis of the program source codes which leads to errors and omissions in the results, and the lack of any clear and rigorous test by which an analyst can judge that their analysis is complete. Dynamic BRE provides a solution for both shortcomings of static BRE, and is fully scaleable to 100% of the business rules which static BRE is not, for programs of significant size and complexity.

Dynamic business rule extraction utilizes a novel method to eliminate these ambiguities and provide 100% of business rules and furthermore document forensically that it has done so. The invention utilizes coverage analysis in a novel way and for a novel purpose in order to solve the very real business problems created by these shortcomings in static BRE.

a) The novelty of the coverage analysis usage with dynamic BRE is that we prepare single transaction test cases and then create a coverage analysis report showing only the lines of source code executed by each single test case.
b) While historically coverage analysis has always been associated with testing, i.e., where the business rules are known and the behavior of the program is uncertain, the novelty of the purpose is that it is being applied to reverse the usual paradigm: to discover the business rules that are unknown or imperfectly known. In doing so it allows the solution to both shortcomings of static BRE.

The invention is based on analyzing the actual execution path during execution against actual data of the compiled object code version of the source code as opposed to the inferred execution during static BRE against data imagined by the static BRE analyst. The object code actually executed with coverage analysis is linked back to the source code so that the dynamic BRE analyst sees a report showing the source code that was and was not executed. Analysts using each method work from the source code, but the dynamic analysis is based on deterministic program code execution while the static analysis is based on inferential program code execution.

Coverage analysis is used in two ways during dynamic BRE:

a) The single transaction coverage analysis report is utilized to discover the business rules associated with the single transaction test case with its unique set of data conditions. This solves the inferential problem with static BRE by enabling a fully deterministic analysis.
b) The cumulative coverage analysis report resulting from the sequential execution of all test cases for a given program is used to determine whether we have achieved 100% coverage in our set of all test cases. This second report solves the problem of static BRE not having a clear and rigorous definition of completion. This report also provides the forensic documentation that the extracted set of business rules are complete, for audit traceability purposes.

A second method of following the program execution could be through the use of an interactive debugger. These utilities provide the ability to not only follow the logic paths actually executed by the program under test, just as is provided by the single transaction coverage analysis reports, but also provides the ability to stop and examine or even modify the values of data variables in memory during the course of code execution for an even deeper understanding, which is not provided by the coverage analysis report. However, this method is so labor intensive and time consuming that it is impractical to use except under rare circumstances. This is an adjunct utility to use in special cases when the single transaction test cases have a scope of execution that is greater that which is desired to reveal the detailed actions of the executing business rules.

The invention also optionally allows for the creation of a Business Rule Execution Path Report which records additional details from the execution to use for an extended analysis in circumstances for which the use of an interactive debugger might otherwise be considered. While this report can frequently be voluminous, it is significantly more efficient for the purpose of eliciting these fine details than an interactive debugger. Among other things, one can back up during analysis of the recorded information, whereas most implementations of interactive debuggers do not allow one to do so.

Completion of dynamic business rule extraction is defined as 100% of the logic paths in the program being executed or explained, either as not being able to be executed or why it is not necessary to execute that logic path. A more complete discussion of explained logic paths is given in the detailed description in section 5.7.

Furthermore, in contrast to static BRE, dynamic BRE can objectively determine whether or not the extracted business rules are valid, as well as documenting forensically that it has done so. We validate the extracted business rules when we take the test cases developed in the process of dynamic BRE against the existing programs, adapt the data and transactions from those tests to the formats used in any replacement system, and execute them against the functionally equivalent modules in the replacement system, thus proving empirically that they are valid by demonstrating equivalence. In other words, during dynamic BRE validation we demonstrate that the reproduced business rules constitute the complete set of business rules without errors or omissions.

The coverage reports created by the execution of the test cases against the existing programs and against the replacement system's program(s) creates the forensic documentation.

This use of test cases derived from the existing program(s) against the replacement program(s) is both novel and non-obvious. Testers develop test cases based on requirements, so that the testers work from the documented functional requirements and documented associated business rules. If these contain ambiguities of expression then the test cases themselves can be as potentially defective as the replacement program(s) themselves, assuming they were built against the same ambiguously expressed functional requirements and associated business rules. Only the machine readable test cases that were validated against the existing program(s), correctly adapted to the replacement program(s), can reliably validate the implementation of the reproduced functions and associated business rules.

Each single update transaction test case executed against a program's replacement reveals any errors or omissions in the documentation of extracted business rules, in the interpretation of those documented business rules, and/or in the implementation of the replacement program. The coverage analysis report from the existing program that accompanies the test case and the coverage analysis report from the equivalent test execution against the replacement program also provides rapid and efficient diagnosis of any observed defect in the replacement program in which it failed to function equivalently.

The cumulative set of update transaction test cases executed against a program's replacement is expected to show 100% of the logic paths executed, since the explained logic paths from the existing programs are not carried forward to a replacement program. If any logic paths are not executed in the replacement, they need to be examined to see if they are the result of technical logic which does not impact the results of the program's execution. However, if there are unexecuted logic paths after excluding technical logic which does impact the results of processing, then they have to be analyzed to determine whether they constitute erroneously or maliciously added business rules.

Dynamic BRE can be used in place of static BRE, or as a complement to static BRE. Dynamic BRE deals with one program at a time, but does so to a greater depth than can usually be achieved by static BRE. However, the one advantage of static BRE is that it can search among all the source codes of the system for business logic associated with specific data conditions. This can be desirable in the situation where a given set of business rules is used in multiple locations in a single program and/or across multiple programs, but the implementation uses subtly different expressions of the rules that, under certain circumstances, can give rise to a different result. Static BRE can thus identify multiple locations where the dynamic BRE analysis needs to focus in order to explore the similarities and differences among the multiple implementations. This is useful and so, in general, one might expect to see static BRE complementing dynamic BRE more often than using dynamic BRE by itself.

Summary of Comparisons Between Use of Coverage Analysis for Testing and Use of Coverage Analysis for Dynamic Business Rule Extraction To Demonstrate Novel Use

| Usage | Testing | Dynamic Business Rule Extraction |
|---|---|---|
| Usage of single transaction coverage analysis | Single transactions are typically used to test the results against known expected results from those data conditions. Coverage analysis is used only with regard to the percentage of program code covered. The internals are typically never examined by testers. | Single transaction coverage reports provide the primary method of observation of the behavior of the program for dynamic BRE purposes. They are used to determine the logic paths executed by that transaction and thereby lead to discovery of unknown or imperfectly known functional requirements and associated business rules and/or of errors and omissions in the functional requirements and associated business rules. |
| Usage of cumulative transaction coverage analysis | Cumulative coverage analysis is typically used to determine whether or not testing has reached a pre-defined threshold of coverage. (Testing is typically halted prior to 100%.) | Cumulative coverage analysis is used to determine whether or not there are remaining potential omissions in the business rules (i.e., logic paths neither executed nor explained)? |

Summary of Technical Comparison of Static and Dynamic Business Rule Extraction

| | Static BRE | Dynamic BRE |
|---|---|---|
| State of program Analytical device | Static Analysis of standalone source code with parsers | Dynamic Analysis of source code with actual execution path information recorded by the executing program code against data. |
| Execution path | Inferred | Actual |
| Data driving the execution | Imagined | Actual |
| Type of analysis | Inferential | Deterministic |
| Objective measure of completion | No | Yes |
| Unambiguous validation of correct business rule extraction | No | Yes |
| Use of single test case coverage analysis with existing programs | N/A | Illuminating logic paths executed for each update transaction against existing program for business rule discovery and extraction |
| Use of cumulative test case coverage analysis with existing programs | N/A | Determining completeness of analysis and revealing potential omissions in the business rules |
| Use of single test case coverage analysis with replacement programs | N/A | Test cases validated against existing programs when adapted for replacement programs which are subsequently executed reveal errors or ambiguities in business rule documentation, interpretation and/or implementation. Coverage report aids debugging by comparison with coverage report from existing program. |
| Use of cumulative test case coverage analysis with replacement programs | N/A | Identifies added business rules that may be the result of potential programming errors or potential malicious coding. |
| Scope of analysis | One or more programs at a time | One program at a time |

2.4 Economic Comparison of Static and Dynamic BRE

Because dynamic BRE analyzes to a greater depth, it might be thought to be more expensive than static BRE covering the same programs. However, by our analysis, dynamic BRE is a bargain:

a) only the programs updating the persistent data store will be analyzed, which are typically 10-30% of the programs in an application suite of programs;
b) the cumulative coverage analysis test cases used for business rule validation and completeness also cover unit testing for the new application, eliminating that cost;
c) the replacement application can be expected to go into production with no discrepancies in the functioning of the business rules, an unheard of level of accuracy which eliminates what can be very considerable last stage costs for finding and debugging discrepancies in pre-production testing or in production operation.

The set of transactional and conceptual business rules associated with any one given function interacts among all the other sets of business rules associated with their respective functions to various degrees. The result is that the effort to extract each next business rule increases as the analysis proceeds. The larger the program the more business rules will be contained therein to discover and extract, and therefore the more this increasing effort impacts the overall effort for that program. These business rule interactions among each other as well as interactions among the various values of parameter data result in a degree of complexity and ambiguity that increasingly impacts any static business rule extraction project as the scale of the application increases. Eventually even the best and brightest business rule analyst will become progressively bogged down in the analysis, as sooner or later this escalating complexity will exceed any human's capability to hold in one's mind.

When using static BRE in projects, we have observed a relationship between the percentage of active business rules actually extracted as a function of effort expended that has approximately the shape of a classic diminishing returns curve (see FIG. 3).

There is a point of diminishing returns beyond which deriving business rules completely and correctly using static BRE from programs of non-trivial complexity becomes impossible in practice, and economically prohibitive. This point is reached at a different scale depending on the language, the implementation standards, and the degree to which the comprehensibility of a given application has degraded over its lifetime due to a large variety of factors, such as for example being maintained by multiple programmers each with different levels of competence and with different programing styles.

Regardless of precisely where the point of diminishing returns is located for a given program, all software programs of non-trivial complexity are subject to this problem of scale forcing static business rule analysis to halt prior to reaching the ideal goal, i.e., providing a 100% complete and correct set of business rules for each functional requirement. The resulting errors and omissions in the business rules of a replacement program show up as defects in the new software application, and can result in delays in deployment that can significantly increase costs and even, in extreme cases, result in project failure. Worse is the situation where the new application goes into production deployment with numerous undetected defects in the business rules. The cost of program and data repair when the system is in production is much, much greater than had the defect been detected at the outset of the new implementation.[2]

[2] For one example, see Michael Lundblad and Moshe Cohen—IBM, March, 2009. Software quality optimization: balancing business transformation and risk.

Dynamic business rule extraction is also subject to diminishing returns but to a significantly lesser extent because a) any residual ambiguities in understanding can be resolved by using an interactive debugging utility to step through the execution instruction by instruction until the ambiguities are resolved empirically or by using the Business Rule Execution Path Report, and b) because we have an objective standard that defines when the business rule extraction effort is complete. "Complete" is defined to mean having analyzed 100% of the logic paths through the program(s) under analysis from the existing software application. In this case, "analyzed" means either by creating a test case with data conditions that force the program to execute that logic path or by explaining why it is not possible or necessary to execute that logic path.

3 SUMMARY

Disclosed are a method, a device and/or a system of dynamic business rule extraction.

In one aspect, the invention allows the user to record and subsequently examine the logic paths executed by an existing program to discover the business rules executed as a result of a transaction and/or of other circumstances that result in a change of state of the persistent data store.

In another aspect, the invention allows the user to examine the deterministic execution of an existing program to discover whether or not all active business rules have been identified.

In another aspect, the invention documents forensically that all active business rules have been identified and that all other business rules have been explained as to why they are not active, so that full traceability is established.

In another aspect, the business rules so extracted may be algorithmic business rules only or algorithmic business rules plus abstract business rules.

In another aspect, the program is analyzed for program source code statements containing business rules using an interactive coverage analysis report.

In another aspect, the logic paths can be annotated with information that is persisted across multiple executions of the program under analysis, and which can be aggregated and analyzed across multiple programs for statistical analyses and other purposes.

In another aspect, the coverage analysis of false branch logic paths occurs under all forms of expression of conditional statements, both explicit and implicit.

In another aspect, the coverage analysis of all conditional components of all compound conditional statements occurs for all compound conditional statements.

In another aspect, an execution path report can be prepared to provide additional detail on the execution of specific statements.

In another aspect, a static business rule extraction utility can be used in conjunction with dynamic business rule extraction to provide complementary capabilities.

In another aspect, the business rules so extracted, whether they be algorithmic business rules only or algorithmic business rules plus abstract business rules, may be validated to discover any errors or omissions in the documentation and/or interpretation and/or re-implementation of those extracted business rules.

In another aspect, any replacement program(s) incorporating the extracted business rules can discover any erroneously or maliciously added business rules.

The methods and systems disclosed herein may be implemented in any means for achieving various aspects, and may be executed in a form of a non-transitory machine-readable medium embodying a set of instructions that, when executed by a machine, cause the machine to perform any of the operations disclosed herein. Other features will be apparent from the accompanying drawings and from the detailed description that follows.

4 BRIEF DESCRIPTION OF THE DRAWINGS

The embodiments of this invention are illustrated by way of example and not limitation in the figures of the accompanying drawings, in which like references indicate similar elements and in which:

FIG. 4 is a small sample of an interactive code coverage report with a monochrome illustration of the color coding provided to the user to highlight areas of attention required. In this case the user is presented with 3 unexecuted logic paths.

Figure 1:
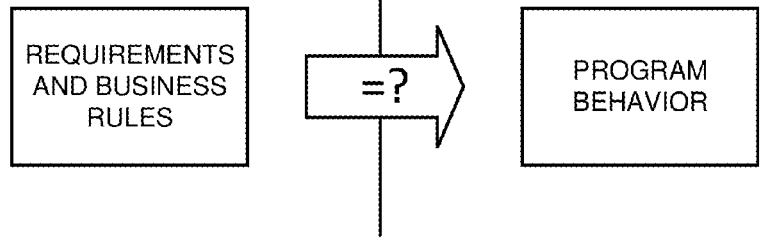
FIG. 1 shows the relationship between functional requirements with associated business rules when testing a program prepared with those requirements and business rules.
Figure 2:
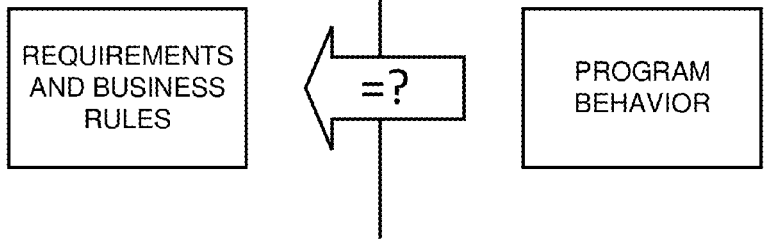
FIG. 2 illustrates the inverted relationship between functional requirements with associated business rules when performing dynamic business rule extraction.
Figure 3:
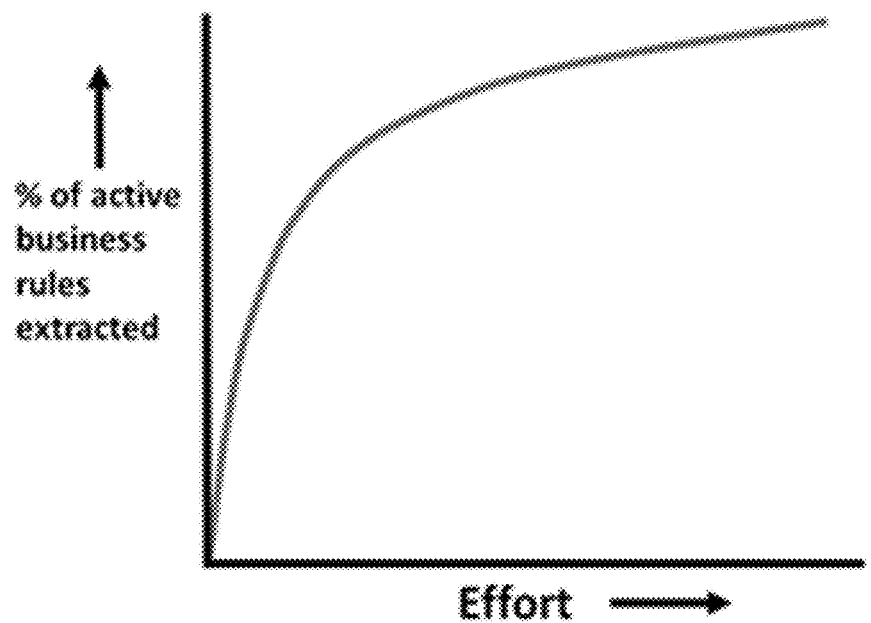
FIG. 3 is an illustration of the diminishing returns relationship between the percentage of business rules extracted using static business rule extraction and the effort of doing so.

FIG. 5 is an update of FIG. 4 in which additional test results have caused 2 of the 3 unexecuted logic paths to be executed, leaving 1 unexecuted logic path for analysis.

FIG. 6 is an update of FIG. 5 in which an explanation is given of why that logic path does not need to be executed.

Other features of the present embodiments will be apparent from the accompanying drawings and from the detailed description that follows.

5 DETAILED DESCRIPTION

Example embodiments, as described below, may be used to provide a method, a device and/or a system of dynamic business rule extraction.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Although the present embodiments have been described with reference to specific example embodiments, it will be evident that various modifications and changes may be made to these embodiments without departing from the broader spirit and scope of the various embodiments. It is to be understood that the specific order or hierarchy of steps in the methods disclosed is an illustration of exemplary processes. Based upon design preferences, it is understood that the specific order or hierarchy of steps in the methods may be rearranged. The accompanying method claims present elements of the various steps in a sample order, and are not meant to be limited to the specific order or hierarchy presented unless specifically recited therein.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language of the claims, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b and c. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. §112, sixth paragraph, unless the element is expressly recited using the phrase "means for" or, in the case of a method claim, the element is recited using the phrase "step for."

The various devices and modules described herein may be enabled and operated using hardware circuitry (e.g., CMOS based logic circuitry), firmware, software or any combination of hardware, firmware, and software (e.g., embodied in a non-transitory machine-readable medium). For example, the various electrical structure and methods may be embodied using transistors, logic gates, and electrical circuits (e.g., application specific integrated (ASIC) circuitry and/or Digital Signal Processor (DSP) circuitry).

5.1 Definition of the Invention

The invention is a software device for discovering 100% of the active business rules that control the functions of a given program which is a proper or improper subset of a computer software application system's set of constituent programs, and documenting forensically that it has done so, using the method of coverage analysis.

5.2 Definitions

| Word or Phrase | Definition or Usage Herein |
| --- | --- |
| [noun](s) | Any reference to any noun X in the form of "X(s)" is defined to be read as meaning "one or more X's". |
| "functional requirements" | specify precisely what each function must do; functional requirements are further specified by association with business rules that specify precisely how each such function shall perform its task. |
| "non-functional requirements" | specify precisely what each non-functional characteristic must be. |
| "business rule" | expresses specific constraints on the creation, updating, and removal of persistent data in an information system. |
| "transaction" | is one element from a set of transient data. |
| "transaction(s)" | is defined as one or more transactions. |
| "query transaction(s)" | is defined as transaction(s) which when processed by program(s) will not change the state of the database. |
| "update transaction(s)" | is defined as transaction(s) which when processed by program(s) may change the state of the database. |
| "conceptual business rules" | The set of conceptual business rules collectively define the concepts, entities, attributes and relationships among the data, from which is derived the vocabulary of the application. Conceptual business rules are associated with both query and update transactions, and include calculations and data movement aspects of any update transaction. |
| "transactional business rule" | A transactional business rule expresses one or more specific constraints on the creation, updating, and removal of persistent data in an information system by an update transaction. A transactional business rule is expressed in terms of the concepts, entities, attributes and relationships from the conceptual business rules. Transactional business rules are associated only with update transactions. |
| "abstract business rules" | Business rules expressed in a general form which is not concerned with a specific implementation of those rules. |
| "algorithmic business rules" | The step by step sequence of instructions required to execute a business rule as would be expressed in some procedural language source code. |
| "hypothesis" | As used herein in the context of business rules, a hypothesis is what is thought to be known about a specific business rule, and may be used as the basis for creating test cases to confirm, refute or amend the hypothesis. |
| "program" | as used herein is defined as referring to any complete set of executable computer commands which may be expressed in any form, and which may include (but is not limited to) any sub-programs, executable logic defined in a database of any kind, executable logic defined in a business rule management system, executable logic controlled by stored data, and/or any other executable component that can be controlled by the author or authors of the program. |
| "mainline program" | is a program which contains the entry point into the program required to initiate execution of the program by any component of the operating system of the computer. A "sub-program" is a program which is not initiated by any component of the operating system of the computer. |
| "program(s)" | is defined to mean either a single program or a set of programs. |
| "source code" of a program | is the human readable set of computer commands which define the executable logic of the program. |
| "object code" of a program | is the set of computer commands which comprise the executable logic of the program and which has been created by any means from the source code; it is typically but not always in a non-human readable form. |

Any given program can be categorized as follows whether executed interactively or in batch:

| | |
| --- | --- |
| "query program" | is defined as a program whose execution will not change the state of the database. |
| an "update program" | is defined as a program whose execution may change the state of the database. Update programs are defined as falling into one of three sub-categories: |
| "periodic batch" | is defined as an update program whose execution may change the state of the database without the input of any |

| Word or Phrase | Definition or Usage Herein |
| --- | --- |
| program | transient data. |
| "transactional batch" program | is defined as an update program whose execution may change the state of the database using batch transaction(s). |
| "interactive" program | is defined as an update program whose execution may change the state of the database using interactive transaction(s). |
| "database" | is defined as the complete set of persistent data that can be queried and/or updated by program(s) including one or more instances of one or more database management systems and/or indexed data files and/or randomly accessed data files and/or sequential data files and/or any other relevant data stores. |
| "transient data" | is defined as any data which is not persisted to permanent storage in a database and may include messages and/or records from data files which will be processed by program(s) in order to change the state of a database or to query data from a database. |
| "production database" | is a database which contains the data used to fulfill the operational purpose of the program(s). |
| "test" | is the process of exercising the executable logic of program(s) to determine whether the behavior of the program(s) produces the results that are expected. |
| "test database" | is a database which contains the data used to test program(s), but which is not used to fulfill the operational purpose of the program(s). A production database may be used as a test database if the updated database is not used to fulfill the operational purpose of the program(s). |
| "baseline database" | is a test database which has been validated to demonstrate that it can be repeatedly reloaded and a consistent set of programs executed in an identical manner to give the identical results each time. |
| "interactive transaction(s)" | refers solely to transaction(s) received as message(s) |
| "batch transaction(s)" | refers solely to record(s) from a file of transaction(s). |
| "periodic batch test case" | is a test database in a specific state such that when processed by periodic batch program(s) will produce an expected result. |
| "transactional test case" | is a test database in a specific state plus transient data such that when the transient data is processed by transactional batch program(s) or interactive program(s) will produce an expected result. |
| "test case" | either a periodic batch test case or a transactional test case. |
| "atomic test case" | is a test case prepared such that it represents the smallest possible execution, typically a single transaction for a transactional test case and the smallest change in the state of the database which is practical for a periodic batch test case. |
| "cumulative test cases" | the summation of all atomic test cases, i.e., the initial set of test cases as augmented over time with additional atomic test cases. |
| "test data" | a test database and one or more periodic batch test cases and/or one or more transactional test cases. |
| "all test data" | the collection of the baseline test database, all test cases, and the test database backup after execution of all test cases. |
| "test data team" | is defined as an individual or team separate from the business rule analyst which is authorized to create test data. |
| "instrumentation" | the process by which program(s) have new source code records inserted into their source codes and/or have existing source code records modified and/or have existing source code records deleted according to pre-programmed rules. "Instrument" is the transitive verb form of instrumentation. |
| "instrumented logic" | consists of the new source records inserted and/or the existing source records modified and/or the existing source records deleted during the process of instrumentation. |
| "instrumentation rules" | consist of the pre-programmed rules which control the source code insertion and/or modification and/or deletion. |
| "coverage analysis" | "coverage analysis", "code coverage", "code coverage analysis", "test code coverage", "test code coverage analysis" and other variations should be understood to refer to precisely the same process, that there is no meaningful distinction among them, and that they can be used interchangeably without ambiguity. |
| "coverage analysis instrumentation" | the process by which the coverage analysis module of the invention will instrument the program(s) with functionally neutral, diagnostic logic that records the logic pathways within the program that are actually executed by the test data presented to the program at execution time. Optionally, the instrumented logic inserted by the coverage analysis module of the invention ensures the recording of both the true logic path and the false logic path whether or not there is an explicit "ELSE" condition contained within the program source code for the logical test in question. Optionally, the instrumented logic inserted by the coverage analysis module of the invention records whether or not each element of a compound conditional expression has been tested. |
| "reference implementation" | is defined as the minimal reproduction of the existing business rule functionality only, usually in the language and execution environment desired for the replacement application. A reference implementation needs only the update transactions reproduced for validation purposes. Query transactions, reports, analytics, a user interface and other non-essentials are not required. If planned properly, the reference implementation can form the nucleus of a new implementation. |

5.3 Dynamic Business Rule Extraction Process

The dynamic business rule extraction process proceeds in one of two ways depending on whether the goal is only algorithmic business rules or algorithmic and abstract business rules. For the indicated form of business rules desired, it is employed in the following step by step manner for each program from which business rules are to be extracted. When the steps are the same for both processes, the step for algorithmic and abstract business rules is indicated as "(same)". When a step applies only to one process, the other entry for that step is "(not applicable)". Although the process is described sequentially for clarity, in practice many steps are independent and those may be performed in parallel or in a different sequence.

| Step | Stage | Algorithmic Rules Only | Algorithmic and Abstract Rules |
| --- | --- | --- | --- |
| 1. | Preparation | Preparation stage begins. | (same) |
| 2. | Preparation | Determine who is authorized to create test data. Test data may be prepared by the business rule analyst or by anyone else designated to do so. | Determine who is authorized to create test data. Test data should be prepared by the test data team, not by the business rule analyst. |
| 3. | Preparation | Create baseline database. A test database must be created and validated as being a baseline database. The baseline database | (same) |

-continued

| Step | Stage | Algorithmic Rules Only | Algorithmic and Abstract Rules |
|---|---|---|---|
| | | can be based on the production database, existing test database(s), newly created data, any other database, or a combination. | |
| 4. | Preparation | Create date independent test environment. If any logic in the program(s) is date dependent, then the test operational environment and/or logic in the program(s) must be modified so that they can be re-executed at any time with the date set to the date at which the baseline database was validated or to any other specific date required for test cases. For the greatest productivity, this should be a virtualized environment. | (same) |
| 5. | Preparation | Secure baseline database. This validated baseline database must be secured such that it can be restored at any time. It is recommended that multiple copies be made that are secured from possible deletion and distributed to backup locations. | (same) |
| 6. | Preparation | Define test and backup procedures. The test procedure must allow the baseline database to be reloaded and all tests executed in a completely repeatable manner at any time. Backup of the test database and other data at other restore points in the process is optional. | (same) |
| 7. | Preparation | Define inventory of programs for business rule extraction. All update programs must have their business rules extracted. Query programs may follow this process if there are conceptual business rules uniquely represented therein, but otherwise query programs are excluded from this process. | (same) |
| 8. | Preparation | Define initial test database according to the program(s) under test. The initial test database for the program(s) under test will consist of the baseline database, plus any data modifications that might be required for the subsequent test cases according to analyses regarding the data conditions that are expected a priori to force the program to execute all active logic paths. | (same) |
| 9. | Preparation | Define initial test cases according to the program(s) under test. The initial set of test cases for program(s) under test will consist of one or more atomic test cases which have been prepared according to analyses regarding the data conditions that are collectively expected to force the program(s) to execute all active logic paths at least once. They may be created as new data, from production data, from existing test data, or a combination. | Define initial test cases for the program(s) under test. An initial set of abstract business rules must be created from business analysis or any other source, and used to create an initial set of test cases for the program(s) under test. Each test case should be linked to the abstract business rule from which it was derived. It is recommended that the initial set of test cases should not be derived from production operations or from existing test cases. |
| 10. | Preparation | Instrument program inventory for coverage analysis. If the program(s) is(are) not written in a language that requires | (same) |

| Step | Stage | Algorithmic Rules Only | Algorithmic and Abstract Rules |
|---|---|---|---|
| | | instrumentation to implement coverage analysis, this step may be skipped. The coverage analysis module of the invention instruments the program(s) from which business rules are being extracted. The instrumented logic consists of functionally neutral, diagnostic logic that records the logic pathways within the program(s) that are actually executed by the test data presented to the program at execution time. | |
| 11. | Preparation | Instrument any relevant individual programs from the inventory to record the sequence of logic paths executed to produce a subsequent Business Rule Execution Path Report. The coverage analysis module of the invention instruments the program(s) from which business rules are being extracted using an alternate set of instrumentation logic. The alternate instrumentation logic consists of functionally neutral, diagnostic logic that records the sequence in which the logic pathways within the program(s) are actually executed by the test data presented to the program at execution time. | (same) |
| 12. | Preparation | Compile instrumented coverage analysis program(s). If the program(s) is(are) not written in a language that requires instrumentation to implement coverage analysis, or if the language does not require compilation, then this step may be skipped. The instrumented version of the program(s) is compiled and link edited, or otherwise prepared for execution according to the technical requirements of the program(s)'s run time environment. | (same) |
| 13. | Preparation | Compile instrumented execution path program(s). If the language in which the program(s) is(are) written does not require compilation, then this step may be skipped. The instrumented version of the program(s) is compiled and link edited, or otherwise prepared for execution according to the technical requirements of the program(s)'s run time environment. | (same) |
| 14. | Preparation | Preparation stage ends. | (same) |
| 15. | Execution | Execution stage begins. | (same) |
| 16. | Execution | Reload baseline database. Reset the database to its initial state. | (same) |
| 17. | Execution | Reset cumulative coverage analysis totals. Execute the coverage analysis utility of the invention to zero out the cumulative coverage analysis statistics for the program(s) being executed. | (same) |
| 18. | Execution | Atomic test case execution. The program is executed against a single atomic test | (same) |

-continued

| Step | Stage | Algorithmic Rules Only | Algorithmic and Abstract Rules |
|---|---|---|---|
| | | case, with the coverage analysis logic creating an output file containing the recorded logic path information for that single test. This output file is used to create a new Business Rule Coverage Analysis Report showing only the logic executed from the atomic test case. | |
| 19. | Execution | Cumulative test cases execution. The program is executed again against the set of cumulative test cases except for the single atomic test case just processed, with the coverage analysis logic creating an output file containing the recorded logic path information which is cumulative over all atomic test cases. This output file is used to create a new Business Rule Coverage Analysis Report showing the cumulative logic executed across all the atomic test cases, or to update a previously created Business Rule Coverage Analysis Report, preserving all annotations. This step is skipped after the first atomic test case execution because no other test cases will have accumulated. | (same) |
| 20. | Execution | Execution stage ends. | (same) |
| 21. | Analysis preparation | Analysis preparation stage begins. | (same) |
| 22. | Analysis preparation | Create the atomic Business Rule Coverage Analysis Report. The output file from step 18 is consumed by the analysis module of the invention, which creates a Business Rule Coverage Analysis Report solely for the atomic test. | (same) |
| 23. | Analysis preparation | Create the cumulative Business Rule Coverage Analysis Report. The output file from step 19 is consumed by the analysis module of the invention, which creates the Business Rule Coverage Analysis Report after the first execution of step 19 or updates it after any subsequent execution(s) of step 19. This step is executed only if step 19 is executed. | (same) |
| 24. | Analysis preparation | Analysis Preparation stage ends. | (same) |
| 25. | Analysis | Analysis stage begins. | (same) |
| 26. | Analysis | Atomic test case analysis. The atomic Business Rule Coverage Analysis Report is examined to extract the business rules from the source code associated with the program executed by the atomic test case. | (same) |
| 27. | Analysis | Determination of 100% coverage. The cumulative Business Rule Coverage Analysis Report summary is examined to determine whether any remaining unexecuted and unexplained logic paths remain in the program. When all logic paths are either executed or explained, the process proceeds to step 33 for validation of | (same) |

-continued

| Step | Stage | Algorithmic Rules Only | Algorithmic and Abstract Rules |
|---|---|---|---|
| | | results. If unexecuted or unexplained logic paths remain in the program, then the analysis continues. | |
| 28. | Analysis | Explanation of unreachable logic paths. The logic paths not executed and not explained are examined to determine whether or not each such logic path is executable or unreachable, and if any are unreachable then each such path will have the unreachable explanation reason entered into the interactive Business Rule Coverage Analysis Report. | (same) |
| 29. | Analysis | Explanation of unexecuted logic paths. Any remaining logic paths not executed and not explained are examined to determine whether they can be explained, and if so then the explanation reason is entered into the interactive Business Rule Coverage Analysis Report for all such explainable logic paths. | (same) |
| 30. | Analysis | Determination of 100% coverage. The Business Rule Coverage Analysis Report summary is examined again, after entering explanations, to determine whether any unexecuted and unexplained logic paths remain in the program. When all logic paths are either executed or explained, the process proceeds to step 33 for validation of results. If unexecuted or unexplained logic paths remain in the program, then the analysis continues. | (same) |
| 31. | Analysis | Revision or extension of test data. The logic paths not executed are examined to determine the data conditions that will force their respective executions, and extracted business rules revised as appropriate in light of the new information. The test data will be revised accordingly to create those data conditions, and the process returns to step 18 for one or more additional executions of revised or new atomic test cases or to step 19 for an additional execution of the program against the revised cumulative test data, as is appropriate based on the analysis. | Revision or extension of test data. The logic paths not executed are examined and the abstract business rule hypotheses revised and/or deleted, and/or new abstract business rule hypotheses created as the business rule analyst seeks to expand the number of logic paths covered by the test execution. The revised business rule hypotheses are documented to the test data team so that the test data can be revised accordingly. The process returns to step 18 for one or more additional executions of revised or new atomic test cases or to step 19 for an additional execution of the program against the revised cumulative test data, as is appropriate based on the analysis. |
| 32. | Analysis | Analysis stage ends, The execution and analysis steps continue iteratively until all logic paths in the program have been executed or explained, at which time the validation stages can proceed. | (same) |
| 33. | Validation preparation | Validation preparation stage begins. The validation stages validate the reproduction of the extracted algorithmic business rules. | Validation preparation stage begins. The validation stages validate the reproduction of the extracted abstract business rules. |

-continued

| Step | Stage | Algorithmic Rules Only | Algorithmic and Abstract Rules |
|---|---|---|---|
| 34. | Validation preparation | Build replacement program(s). When the business rules are reproduced in replacement program(s), they are likely to suffer from errors and omissions in the reproduced application, as well as errors and omissions due to mis-interpretation of the documented business rules. The reproduced application must be directly equivalent to the existing application, or can be equivalently mapped. | Build reference implementation. When the business rules are reproduced in the reference implementation, they are likely to suffer from errors and omissions in the expression of the business rules, as well as errors and omissions due to mis-interpretation of business rules documented. The reference implementation can become the nucleus of a new application after validation. |
| 35. | Validation preparation | Convert test data. The baseline database and all test data must be mapped to the reproduced application and converted appropriately. | Convert test data. The baseline database and all test data must be mapped to the reference implementation and converted appropriately. |
| 36. | Validation preparation | Automate validation test executions. It is recommended that all test cases be executed using test automation tools and techniques, including interactive tests. | (same) |
| 37. | Validation preparation | Prepare to discover any newly introduced business logic. The replacement program(s) is(are) prepared for coverage analysis using instrumentation or otherwise as appropriate for the language and run time environment. | (same) |
| 38. | Validation preparation | Validation preparation stage ends. | (same) |
| 39. | Validation execution | Validation execution stage begins. | (same) |
| 40. | Validation execution | Execute validation tests. The test cases must be executed against the reproduced application. | Execute validation tests. The test cases must be executed against the reference implementation. |
| 41. | Validation execution | Execute comparison of results. The results of executing the reproduced application must be compared against the results of execution from the existing program(s). This means, at a minimum, that the test database backed up after execution of all test cases from the existing application must be automatically compared for equivalence with the new test database. | Execute comparison of results. The results of executing the reference implementation must be compared against the results of execution from the existing program(s). This means, at a minimum, that the test database backed up after execution of all test cases from the existing application must be automatically compared for equivalence with the new test database. |
| 42. | Validation execution | Validation execution stage ends. | (same) |
| 43. | Validation analysis | Validation analysis stage begins. | (same) |
| 44. | Validation analysis | Analyze results of comparison. If all of the tests produce identical or functionally equivalent results, then the analysis confirms that all algorithmic business rules were reproduced correctly. If not, then the cause of the discrepancies must be diagnosed and all discrepancies resolved, followed by re-executing the test cases against the replacement application program(s). | Analyze results of comparison. If all of the tests produce identical or functionally equivalent results, then the analysis confirms that all abstract business rules were reproduced correctly. If not, then the cause of the discrepancies must be diagnosed and all discrepancies resolved, followed by re-executing the test cases against the reference implementation program(s). |
| 45. | Validation analysis | Analysis for newly introduced business logic. The cumulative coverage analysis reports for each of the replacement application's program(s) is(are) analyzed. If all logic paths in those program(s) are executed | Analysis for newly introduced business logic. The cumulative coverage analysis reports for each of the reference implementation's program(s) is(are) analyzed. If all logic paths in the program(s) are |

-continued

| Step | Stage | Algorithmic Rules Only | Algorithmic and Abstract Rules |
|---|---|---|---|
| | | by the cumulative test cases, then the replacement application has been demonstrated to have an equivalent range of functionality. However, if there are logic paths not executed by this set of tests, then those logic paths can be examined to see whether they represent program development errors, technical logic or possibly malicious code introduced into the programs. This is the only mechanism by which such possibly malicious code can be exposed in a rigorous and comprehensive manner. | executed by the cumulative test cases, then the replacement application has been demonstrated to have an equivalent range of functionality. However, if there are logic paths not executed by this set of tests, then those logic paths can be examined to see whether they represent program development errors, technical logic or possibly malicious code introduced into the programs. This is the only mechanism by which such possibly malicious code can be exposed in a rigorous and comprehensive manner. |
| 46. | Validation analysis | Validation analysis stage ends. | Validation analysis stage ends. |

5.4 Validating 100% Business Rule Extraction

Proper use of the above process with the invention will result in a set of tests that will exercise 100% of the active business rules from the existing program(s), excluding only those business rules which have been explained as unexecutable or otherwise unnecessary. The details of the logic revealed during analysis of the Business Rule Coverage Analysis Report can be documented as algorithmic business rules or abstracted into abstract business rules.

When extracting only algorithmic rules, it is not necessary to abstract these rules—only to reproduce them in a different implementation. Having done so, then the tests that are a by-product of dynamic business rule extraction can be employed to validate the extraction. If the extracted rules produce the same results in the new implementation, then they have been validated.

To perform the validation of the algorithmic business rules, the tests will have to be adapted to the replacement implementation and the baseline database converted to the new database format. Then the test database after all test cases have been executed also has to be converted to a separate instance of the new database format. When executing the converted tests against the converted data, the expected results have to be obtained for each execution. A failure to obtain the expected results constitutes an error in the documentation of the business rules, in the interpretation of the business rules, or in the implementation of the replacement application. After all tests have been executed then the contents of the new database should be equivalent to the final contents from the tests executed against the existing programs. If all expected results are obtained and the final contents test equivalently, then 100% of the algorithmic business rules have been reproduced and thereby validated.

For abstract business rules, validation of 100% coverage is more complex but still readily done and cost effective. For the circumstances in which 100% abstract business rule extraction is pursued, the goal of doing is generally either because the rules are going to be configured into a package or because the application is being redesigned. In order to validate the 100% coverage, a minimal reference implementation is required. Then the actual validation process proceeds against the reference implementation just as for the algorithmic rule validation above.

5.5 Unique Aspects of the Invention

| Invention | Prior Art |
|---|---|
| The coverage analysis module of the invention supports or can be readily extended to support all grammar based computer programming languages executing on all computer hardware platforms rapidly and at low cost. | Coverage analysis tools typically support only one or a small number of languages because of their expensive and inflexible implementations. |
| The coverage analysis module of the invention provides coverage for the false branch of a conditional statement when there is no explicit ELSE condition. | Coverage analysis tools support only the explicit branches. |
| The coverage analysis module of the invention supports covering all conditional clauses of a compound conditional statement. | Coverage analysis tools support only the conditional statement as a whole. |
| The invention is fully scaleable to programs of any size and complexity. | Both manual methods and static BRE cannot scale to handle programs of significant size and complexity without errors and/or omissions. |
| The invention can detect whether all logic paths through any given program have been executed and can maintain the annotations of logic paths that have been explained rather than executed. | Static business rule extraction tools cannot do this. Furthermore, there is no method by which an analyst can determine that they have reached 100%. |
| The invention can validate the extracted algorithmic or abstract business rules by adapting the set of test cases used for dynamic BRE to the formats of a replacement program, and executing them against that replacement program. | Not known to be part of the prior art. |
| The invention can detect new business rules added to a replacement program, whether intentionally, erroneously or maliciously. When validating 100% business rule extraction in a replacement program, if there is any business logic not executed by the series of tests then that logic has been added. | Not achievable by any static source code analytic process.. |
| The Business Rule Coverage Analysis Report allows the creation and maintenance of a list of the hypothesized abstract business rules as they are created and refined during the test and analysis process. | No other method extracts abstract business rules. |

-continued

| Invention | Prior Art |
|---|---|
| Furthermore, the Business Rule Coverage Analysis Report allows each decision point within the program to be annotated according to which abstract business rule this logic path is related, for traceability, the related abstract business rule having been created and/or maintained within the Business Rule Coverage Analysis Report created and/or updated in step 19. | No other method extracts abstract business rules. |
| Furthermore, the Business Rule Coverage Analysis Report allows each branch of each decision point within the program to be displayed color coded according to whether or not a business rule has been associated with this logic path is related. | No other method extracts abstract business rules. |
| Furthermore, the Business Rule Coverage Analysis Report may be optionally supplemented with a Business Rule Execution Path Report to reveal the sequence of program statements executed where this is ambiguous in the Business Rule Coverage Analysis Report. | No other method has a Business Rule Execution Path Report. |
| Furthermore, the Business Rule Execution Path Report may optionally be extended to show the values of referenced data elements at each conditional statement executed. | No other method has a Business Rule Execution Path Report. |

5.6 Business Rule Coverage Analysis Report

The Business Rule Coverage Analysis Report contains both analytical elements and interactive elements. The analytical elements are drawn from the information in the output file from steps (18) and (19) and may be queried but not modified by the business rule analyst.

a) These analytical elements are created with every execution of an atomic test case, and no interactive elements are entered or persisted to permanent storage. The atomic test case coverage reports must be managed appropriately to ensure that they are not overwritten or otherwise lost during the testing and analysis cycle.

b) These analytical elements are created when the first cumulative Business Rule Coverage Analysis Report is created for the program with the first cumulative test execution, and updated with every execution of the cumulative test cases thereafter. The interactive elements are persisted to permanent storage and preserved across each update report from cumulative test cases.

The analytical elements of the Business Rule Coverage Analysis Report displays the original program source code, optionally modified as described above to show any implicit false branches and the optional expansion of any compound conditionals, showing all logic paths executed and not executed.

Furthermore, the Business Rule Coverage Analysis Report may or may not be configured to cause the display of each decision point within the program to be color coded according to whether the true branch, false branch or both is unexecuted or unexplained.

Furthermore, the Business Rule Coverage Analysis Report may or may not be configured to cause the display of the program logic within each branch from each decision point within the program to be color coded according to whether that code has been executed.

The interactive elements of the Business Rule Coverage Analysis Report allows each branch of each decision point within the program to be marked by the human analyst according to whether it is obsolete or for some other reason is explained (see section 5.7).

The interactive elements of the Business Rule Coverage Analysis Report allows the entry or updating of information from the analysis by the business rule analyst, which is usually applicable only to the cumulative coverage report. In this small example from a COBOL program (see FIG. 4), we see that the conditional statement at line 00686 has only had the true logic path executed as indicated by the "B1" code in the coverage column, and line 00689 has had neither the true nor the false logic path executed as indicated by the "B0" code. The yellow color coding in the Source column indicates that lines 00686 and 00689 had incomplete or no execution. The red color coding in the Reason True and Reason False columns indicates that a reason is missing if this logic path is to be explained rather than executed:

a) a reason for the false logic path being unexecuted at line 00686.

b) a reason for both the true logic path and false logic path being unexecuted at line 00689.

The next step for the dynamic BRE analyst is to create an atomic test case that will cause the unexecuted logic paths to execute, and the test case executed to create a Business Rule Coverage Analysis Report. The existing cumulative set of test cases should be executed and the new atomic test case added to the cumulative set. The results of the cumulative test case execution, after updating the coverage report (see FIG. 5), shows that:

a) Both logic paths at line 00686 have now been executed, as indicated by the "B3" Coverage code, therefore the red text on yellow color coding in the Source column remains and the red color coding in the Reason False column have both disappeared.

b) Although the true logic path at line 00689 has had its true branch executed, and therefore the red in the Reason True column has disappeared, the false logic path remains unexecuted. Therefore the red text on yellow color coding in the Source column and the red color coding in the Reason False column remain.

c) Note that an abstract rule number ("123") has been entered for the conditional and associated logic path at line 00686 for traceability.

In this case, it is not useful to force the execution of the false logic path at line 00689 because that path contains only technical logic, i.e., there were no business rules found in the analysis of that logic path. Therefore, instead of making a new test case, the dynamic BRE analyst updates the information in the interactive Business Rule Coverage Analysis Report to indicate a reason why that logic path does not need to be executed (see FIG. 6).

a) In this example, the reason entered was "Abend I/O Error" for the false branch, which resets the red color coding to light grey.

b) In addition, the dynamic BRE analyst also enters a "filter" code, "F2" in this case, to indicate that the logic path has been explained, which resets the red text on yellow in the Source column to dark blue text on light grey.

The following attributes of the Business Rule Coverage Analysis Report are only relevant to abstract business rule extraction:

a) The Business Rule Coverage Analysis Report allows the creation and maintenance of a list of the hypothesized abstract business rules as they are created and refined during the test and analysis process.

b) The Business Rule Coverage Analysis Report allows each decision point within the program to be marked according to which abstract business rule(s) this logic path is related, for traceability, the related abstract business rule having been created and/or maintained within the list created and/or maintained in step 22 of section 5.3.

c) Furthermore, the Business Rule Coverage Analysis Report optionally allows each branch of each decision point within the program to be displayed color coded according to whether or not a business rule has been associated with this logic path is related.

5.7 Explained Unexecuted Branches

A key aspect of the dynamic business rule extraction is that all logic paths in the program be executed or explained. There are many valid reasons why a logic path need not be analyzed for business rules. The following list is illustrative of explanations but not exhaustive:

| Reason | Explanation |
| --- | --- |
| Code is unreachable | there are no combinations of data conditions that will allow this code to execute. |
| Code is obsolete | there are combinations of data that could cause this logic path to execute, but they are associated with program functions that are no longer in use. |
| Code is technical logic | this logic serves a technical role within the program but does not contribute to any business meaningful logic. |
| Program defects | the analysis uncovered functions that should not be analyzed because they represent defective logic. |
| Test logic | specific logic paths are only relevant to program testing and do not contribute to business knowledge. |
| Event dependent logic | adverse operational events are typically associated with I/O errors and the logic paths that attempt a recovery, or they document the error prior to abnormally terminating the program, or follow a different recovery process. |
| Data consistency failure | database referential integrity is enforced in program logic. This is captured as a conceptual business rule but the logic path need not be traversed to do so. |

What is claimed is:

1. A computer-implemented method for extracting business rules from an existing program using coverage analysis reporting which statements of the program logic have and have not been executed, wherein the business rules are associated with one or more constraints on the creation, updating and deletion of persistent data, comprising:
   generating a coverage analysis report of the execution of the existing program;
   identifying and selecting a portion of the program's source code containing one or more business rules from the program's source code statements shown as having been executed in the coverage analysis report;
   analyzing the selected portion of the program's source code to identify one or more business rules;
   grouping the program's source code statements that are relevant to each business rule identified from the selected portion of the program's source code;
   documenting each identified business rule with the algorithmic sequence of program logic steps from the grouped program source code statements that are relevant to that identified business rule;
   creating an additional coverage analysis report for the existing program using a different set of data conditions for the purpose of at least one of: identification of additional algorithmic steps relevant to each identified business rule and identification of additional business rules; and
   continuing to iterate this process until all active business rules have been identified and until all algorithmic steps identified with each of these identified business rules have been documented.

2. The method of claim 1, further comprising generating an interactive coverage analysis report.

3. The method of claim 2, wherein the interactive coverage analysis report further comprises recordation of one or more annotations for one or more logic paths of the existing program.

4. The method of claim 3, further comprising aggregating and analyzing the one or more annotations and coverage analysis report statistics across a plurality of coverage analysis reports.

5. The method of claim 1, further comprising reporting of false branch logic paths under all forms of expression of conditional statements in the coverage analysis report.

6. The method of claim 1, further comprising reporting of all conditional components of all compound conditional statements in the coverage analysis report.

7. The method of claim 1, further comprising abstracting an algorithmic sequence of program logic steps identified with an identified business rule into an abstract business rule.

8. The method of claim 1, further comprising generating an execution path report comprising an execution path of the existing program.

9. The method of claim 1, further comprising the use of an interactive debugger for the language of the existing program to follow an execution path of the execution of the existing program interactively.

10. The method of claim 1, further comprising a static business rule extraction process to be used in conjunction with the dynamic business rule extraction process to extract each business rule of the existing program.

11. The method of claim 1, further comprising validating the extracted business rules.

12. The method of claim 11, further comprising the detection of erroneously or maliciously added business rules during the validation of the extracted business rules.

13. A computer-implemented system for extracting business rules from an existing program using coverage analysis reporting which statements of the program logic have and have not been executed, wherein the business rules are associated with one or more constraints on the creation, updating and deletion of persistent data, comprising:
   generating a coverage analysis report of the execution of the existing program;
   identifying and selecting a portion of the program's source code containing one or more business rules from the program's source code statements shown as having been executed in the coverage analysis report;
   analyzing the selected portion of the program's source code to identify one or more business rules;
   grouping the program's source code statements that are relevant to each business rule identified from the selected portion of the program's source code;
   documenting each identified business rule with the algorithmic sequence of program logic steps from the grouped program source code statements that are relevant to that identified business rule;
   creating an additional coverage analysis report for the existing program using a different set of data conditions for the purpose of at least one of: identification of additional algorithmic steps relevant to each identified business rule and identification of additional business rules; and
   continuing to iterate this process until all active business rules have been identified and until all algorithmic steps identified with each of these identified business rules have been documented.

14. The system of claim 13, providing the means to create an interactive coverage analysis report.

15. The system of claim 13, providing the means to record annotations for selected logic paths.

16. The system of claim 13, providing the means to generate an execution path report.

17. The system of claim 13, providing the means to validate extracted business rules.

18. The system of claim 17, providing the means to detect erroneously or maliciously added business rules during the validation of the extracted business rules.

* * * * *